United States Patent
Wang et al.

(10) Patent No.: US 12,436,793 B2
(45) Date of Patent: Oct. 7, 2025

(54) VIRTUAL MACHINE MANAGEMENT

(71) Applicant: International Business Machines Corporation, Armonk, NY (US)

(72) Inventors: Yuan Yuan Wang, Beijing (CN); Qi Feng Huo, Beijing (CN); Da Li Liu, Beijing (CN); Lei Li, Beijing (CN); Yan Song Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 18/051,911

(22) Filed: Nov. 2, 2022

(65) Prior Publication Data

US 2024/0143373 A1 May 2, 2024

(51) Int. Cl.
*G06F 9/455* (2018.01)

(52) U.S. Cl.
CPC .. *G06F 9/45558* (2013.01); *G06F 2009/4557* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,219,987 B1 * | 7/2012 | Vlaovic | | G06F 9/448 |
| | | | | 718/1 |
| 8,918,512 B2 | 12/2014 | Frey et al. | | |
| 2010/0275241 A1 | 10/2010 | Srinivasan | | |
| 2011/0142053 A1 * | 6/2011 | Van Der Merwe | ... | G06F 9/5077 |
| | | | | 370/395.1 |
| 2020/0218579 A1 * | 7/2020 | D M | | G06F 16/24578 |
| 2022/0121467 A1 * | 4/2022 | Bonnal Conduzorgues | | |
| | | | | G06F 9/5077 |
| 2023/0027507 A1 * | 1/2023 | He | | H04L 63/101 |
| 2023/0222006 A1 * | 7/2023 | Zhu | | G06F 9/5077 |
| | | | | 718/104 |

(Continued)

FOREIGN PATENT DOCUMENTS

| | | |
|---|---|---|
| CN | 112667362 B | 6/2022 |
| CN | 114675940 A | 6/2022 |
| WO | WO-2018185531 A1 * | 10/2018 ........... G06F 9/5061 |

OTHER PUBLICATIONS

"Kubevirt Managing Virtual Machines," SoByte, copyright 2021-2022, accessed Aug. 19, 2022, 19 pages. https://www.sobyte.net/post/2022-05/kubevirt/.

(Continued)

*Primary Examiner* — S. Sough
*Assistant Examiner* — Selena Sabah Nahra
(74) *Attorney, Agent, or Firm* — Yee & Associates, P.C.

(57) ABSTRACT

Virtual machine management is provided. A virtual machine is started automatically based on a custom resource definition of the virtual machine in response to the receiving the custom resource definition of the virtual machine. A container is generated to run an application workload in the virtual machine based on a container configuration file in response to the virtual machine starting. The application workload is deployed on the container automatically based on a container image corresponding to the container. The application workload is run on the container automatically in accordance with a definition of the application workload.

20 Claims, 6 Drawing Sheets

(56) References Cited

U.S. PATENT DOCUMENTS

2024/0012693 A1* 1/2024 Jigalur ............... G06F 9/45558
2024/0078127 A1* 3/2024 Aygar .................... G06F 9/455

OTHER PUBLICATIONS

Vossel, "KubeVirt: Extending Kubernetes with CRDs for Virtualized Workloads," Kubernetes Blog, Jul. 27, 2018, accessed Aug. 19, 2022, Copyright 2022, The Linux Foundation, 6 pages. https://kubernetes.io/blog/2018/07/27/kubevirt-extending-kubernetes-with-crds-for-virtualized-workloads/.

Fehlig et al., "Using KubeVirt on SUSE Linux Enterprise," SUSE Linux Enterprise Server 15 SP3, accessed Aug. 19, 2022, copyright 2022, SUSE, 24 pages. https://documentation.suse.com/sbp/all/html/SBP-KubeVirt-SLES15SP3/index.html.

* cited by examiner

VIRTUAL MACHINE MANAGEMENT

BACKGROUND

1. Field

The disclosure relates generally to container orchestration architectures and more specifically to automatically running application workloads in containers within virtual machines of a container orchestration architecture in a secure manner.

2. Description of the Related Art

A container orchestration architecture, such as, for example, Kubernetes® (a registered trademark of the Linux Foundation of San Francisco, California, USA), provides a platform for automating deployment, scaling, and operations of containers across clusters of worker nodes (also known as host nodes, compute nodes, minions, and the like). A worker node is a machine, either physical or virtual, where containers (i.e., application workloads) are deployed. A pod is a group of one or more containers, with shared storage and network resources, and a specification for how to run the containers. A pod's contents are always co-located and co-scheduled and run in a shared context. The worker node hosts the pods that are the components of the application workloads.

SUMMARY

According to one illustrative embodiment, a computer-implemented method for virtual machine management is provided. A computer, using a virtual machine launcher, starts a virtual machine automatically based on a custom resource definition of the virtual machine in response to the virtual machine launcher receiving the custom resource definition of the virtual machine from a virtual machine handler. The computer, using a workload interpreter of the virtual machine, generates a container to run an application workload in the virtual machine based on a container configuration file in response to the virtual machine launcher starting the virtual machine. The computer, using the workload interpreter of the virtual machine, deploys the application workload on the container automatically based on a container image corresponding to the container. The computer, using the workload interpreter of the virtual machine, runs the application workload on the container automatically in accordance with a definition of the application workload. According to other illustrative embodiments, a computer system and computer program product for virtual machine management are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
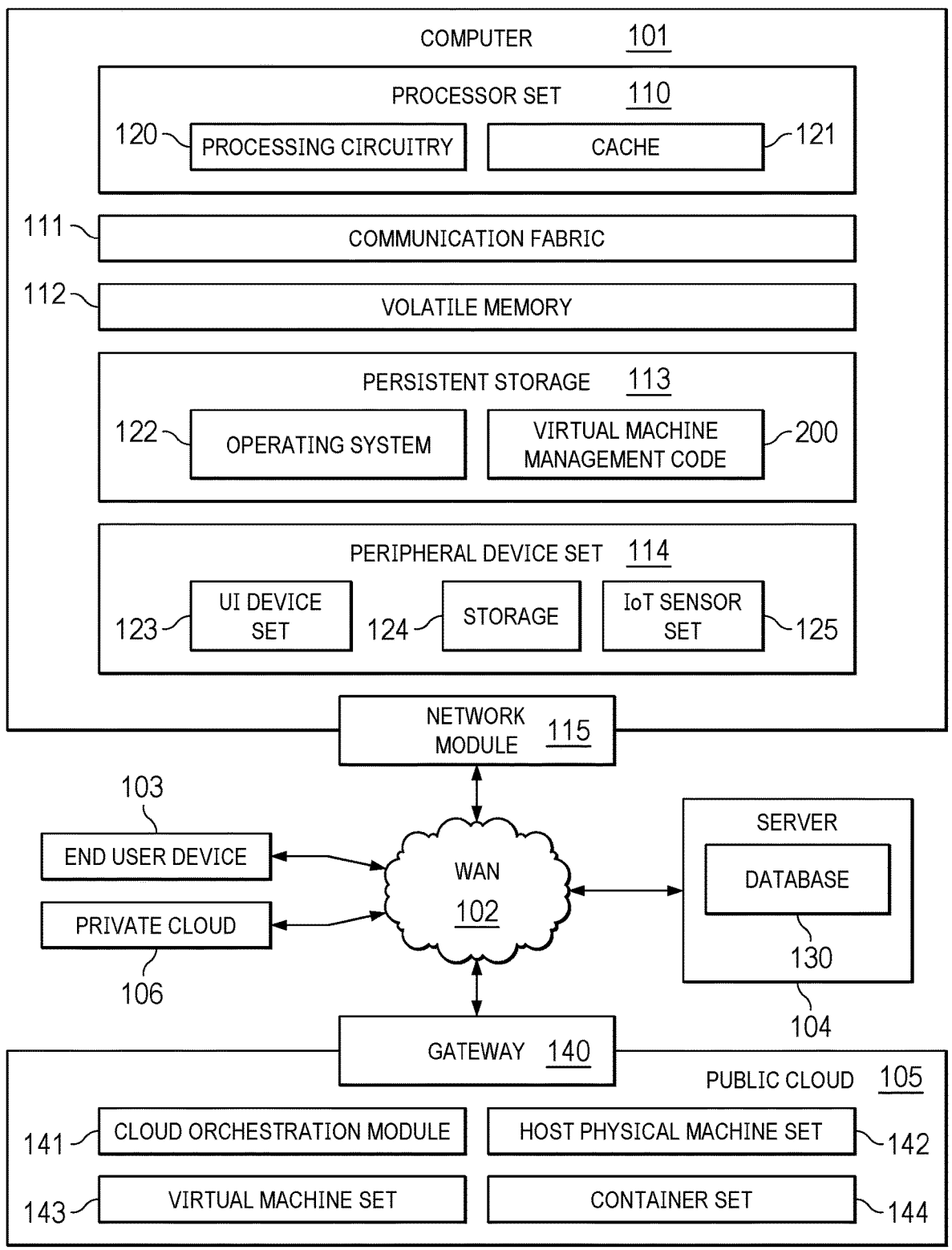
FIG. 1 is a pictorial representation of a computing environment in which illustrative embodiments may be implemented.
Figure 2:
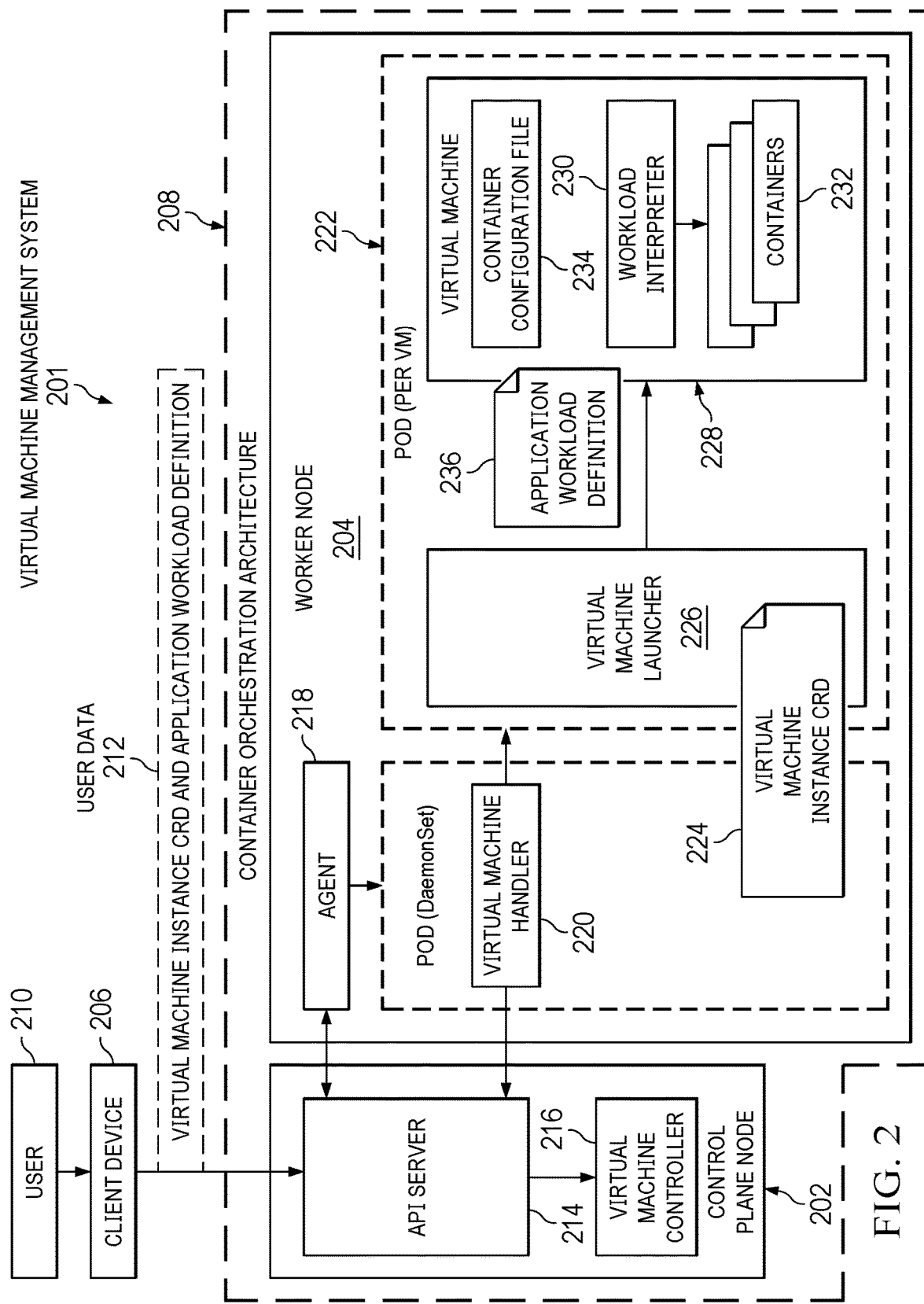
FIG. 2 is a diagram illustrating an example of a virtual machine management system in accordance with an illustrative embodiment.
Figure 3:
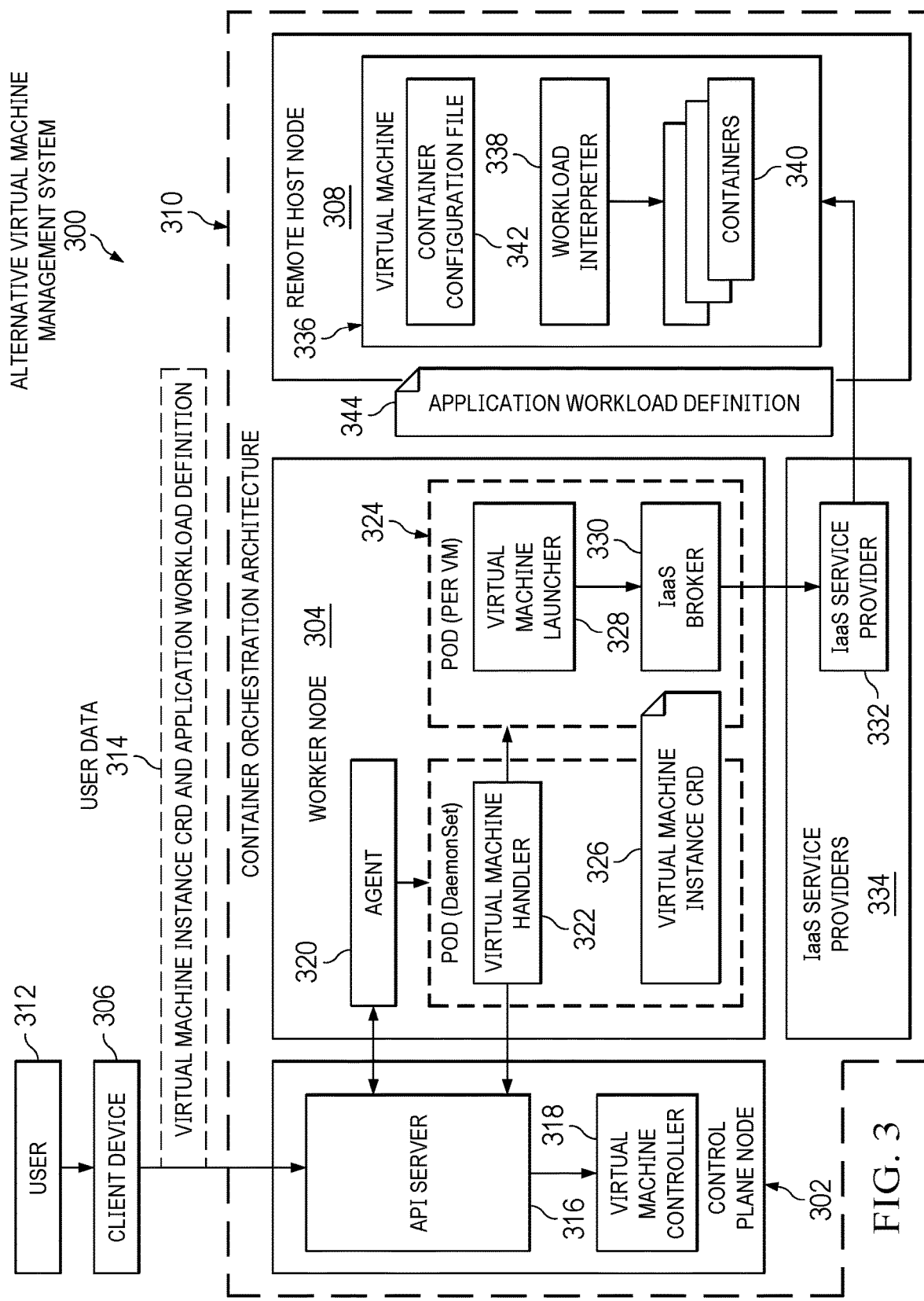
FIG. 3 is a diagram illustrating an example of an alternative virtual machine management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as virtual machine management code 200. Virtual machine management code 200 automatically runs application workloads in containers within virtual machines of a container orchestration architecture in a secure manner.

In addition to virtual machine management code block 200, computing environment 100 includes, for example, computer 101, wide area network (WAN) 102, end user device (EUD) 103, server 104, public cloud 105, and private cloud 106. In this embodiment, computer 101 includes processor set 110 (including processing circuitry 120 and cache 121), communication fabric 111, volatile memory 112, persistent storage 113 (including operating system 122 and virtual machine management code 200, as identified above), peripheral device set 114 (including user interface (UI) device set 123, storage 124, and Internet of Things (IoT) sensor set 125), and network module 115. Server 104 includes database 130. In addition, server 104 may represent a set of servers. Public cloud 105 includes gateway 140, cloud orchestration module 141, host physical machine set 142, virtual machine set 143, and container set 144.

Computer 101 may take the form of a computer, mainframe computer, quantum computer, or any other form of computer now known or to be developed in the future that is capable of running a program, accessing a network, and querying a database, such as database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in virtual machine management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The virtual machine management code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a system administrator of an entity that operates computer 101), and may take any of the forms discussed above in connection with computer 101. EUD 103 typically receives helpful and useful data from the operations of computer 101. For example, in a hypothetical case where computer 101 is designed to provide a virtual machine management recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

Server 104 is any computer system that serves at least some data and/or functionality to computer 101. Server 104 may be controlled and used by the same entity that operates computer 101. Server 104 represents the machine(s) that collect and store helpful and useful data for use by other computers, such as computer 101. For example, in a hypothetical case where computer 101 is designed and programmed to provide a virtual machine management recommendation based on historical data, then this historical data may be provided to computer 101 from database 130 of server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

A container orchestration architecture, such as, for example, Kubernetes, orchestrates containerized application workloads in a cloud environment. However, it should be understood that Kubernetes is intended as an example architecture only and not as a limitation on illustrative embodiments. In other words, illustrative embodiments may utilize any type of container orchestration architecture, platform, infrastructure, or environment that provides automated deployment, scaling, and operations of containers across worker or host nodes.

The container orchestration architecture manages the containerized application workloads in pods. Many application workloads, such as, for example, databases, message queues, cryptographic software, and the like, need to be isolated within a virtual machine, but not run as a pod in a container orchestration architecture. A virtual machine manager, such as, for example, KubeVirt, can extend the container orchestration architecture by providing additional virtualization resource types, such as, for example, virtual machine resource types, utilizing a custom resource definition. The custom resource definition for a virtual machine contains a group of virtual machine objects that defines the properties of the virtual machine, such as, for example, host machine type, central processing unit (CPU) type, amount of memory, number of virtual CPUs, amount of storage, number and type of network interface cards, and the like.

By utilizing the custom resource definition, an application programming interface (API) server of the container orchestration architecture can manage these virtual machine resources, along with the other resource types, such as, for example, pods, deployments, and the like, provided by the container orchestration architecture. However, when the virtual machine manager manages the lifecycle of the virtual machines, a user needs to deploy the application workloads in the virtual machines separately, which causes security issues.

For example, when a user wants to deploy an application workload into a virtual machine, the user has to manually deploy the application workload or utilize some type of script, such as, for example, a shell script or the like. Either way, the user has to login to the virtual machine, which causes security issues. For example, the user's application workload and user data are exposed to anyone who is able to login to the virtual machine. Further, by the user deploying the application workload, more time is needed for the application workload to be made ready for use.

Illustrative embodiments control the lifecycle of virtual machines by automatically running application workloads in the virtual machines utilizing container images, such as, for example, Open Container Initiative images. In addition, illustrative embodiments isolate an application workload within a container of a virtual machine utilizing pod storage and networking. However, it should be noted that illustrative embodiments are different from virtualization of isolated pods, such as, for example, Kata Containers® (a registered trademark of OpenStack Foundation of Austin, Texas, USA). Kata Containers is an open source community that builds a secure runtime with virtual machines that perform similar to containers, but provide workload isolation using hardware virtualization technology.

Illustrative embodiments enable the user to utilize the container orchestration architecture of a cloud environment to automatically manage the user's application workload in a virtual machine resource generated by illustrative embodiments. Illustrative embodiments utilize a custom resource definition of a virtual machine to introduce the application workload. In addition, illustrative embodiments pass a definition of the application workload into the virtual machine. Illustrative embodiments start and configure the virtual machine using the custom resource definition of the virtual machine. Illustrative embodiments utilize a container of the virtual machine to run the application workload.

For example, the user, utilizing a client device, sends user data including the custom resource definition of the virtual machine and the definition of the application workload to the API server of the control plane node of the container orchestration architecture. In response to the API server receiving the user data with the custom resource definition of the virtual machine and the application workload definition, a virtual machine controller of the control plane node assigns the virtual machine, which will run the application workload, to an appropriate worker node in the container orchestration architecture of the cloud environment based on the custom resource definition of the virtual machine and the application workload definition. In other words, the virtual machine controller monitors for any new custom resource definitions of virtual machines posted to the API server and assigns the virtual machines to worker nodes having the resources needed by each particular virtual machine.

In response to a given worker node receiving an assignment of a particular virtual machine, along with the custom resource definition of the virtual machine and the application workload definition, an agent or program, such as, for example, a kubelet, running on the worker node, which is responsible for communications between the control plane node and worker node, invokes a virtual machine handler of the assigned worker node. It should be noted that a virtual machine handler runs on each respective worker node in the cluster of worker nodes.

The virtual machine handler generates a pod for the virtual machine on the worker node based on the custom resource definition of the virtual machine. It should be noted that the virtual machine handler generates one pod per virtual machine. In other words, the virtual machine handler generates a pod for each respective virtual machine that will run on the worker node. In addition, the virtual machine handler performs a health check on generated containers in the virtual machine based on pod specifications and sends the health status of the containers in the pod to the API server of the control plane node. A pod specification is a YAML file or JSON object that defines a particular pod. The virtual machine handler utilizes the pod specification to ensure that the containers described in that particular pod specification are running and healthy.

The virtual machine handler signals a virtual machine launcher within the pod, which runs the virtual machine launcher, to start the virtual machine by passing the custom resource definition of the virtual machine to the virtual machine launcher. In response to receiving the custom resource definition of the virtual machine from the virtual machine handler, the virtual machine launcher automatically starts and configures the virtual machine based on the custom resource definition of the virtual machine. In response to the virtual machine launcher starting and configuring the virtual machine, a workload interpreter of the virtual machine utilizes a container configuration file to generate a set of containers in the virtual machine. The container configuration file defines the runtime and execution parameters of the set of containers. Further, the workload interpreter of the virtual machine automatically runs the application workload on the set of containers in accordance with the definition of the application workload.

In an alternative illustrative embodiment, the virtual machine launcher communicates with an Infrastructure-as-a-Service (IaaS) broker of the pod and sends the custom resource definition of the virtual machine and the definition of the application workload to the IaaS broker. The IaaS broker selects a particular IaaS service provider from a plurality of different IaaS service providers based on, for example, a set of criteria, such as service level agreement, user need, IaaS service provider availability, IaaS service provider pricing, IaaS service provider resources, and the like, along with the custom resource definition of the virtual machine and the definition of the application workload. The selected IaaS service provider will host the virtual machine on a remote host node of the IaaS service provider in a hybrid cloud environment. The hybrid cloud environment is comprised of, for example, the worker node being located in a private cloud and the remote host node being located in a public cloud.

In response to the IaaS broker selecting the IaaS service provider, the virtual machine launcher on the worker node starts and configures the virtual machine on the remote host node. Then, the workload interpreter of the virtual machine utilizes the container configuration file to generate the set of containers in the virtual machine. Moreover, the workload interpreter of the virtual machine automatically deploys the application workload on the set of containers based on a container image corresponding to the set of containers without user login to the virtual machine to deploy the application workload into the virtual machine. The workload interpreter of the virtual machine automatically runs the application workload on the set of containers in accordance with the definition of the application workload.

As a result, illustrative embodiments automatically run and manage application workloads in containers within virtual machines of the container orchestration architecture in a secure manner. In other words, illustrative embodiments securely run the virtual machines by automatically deploying the application workloads in containers of the virtual machines so that the user does not need to login to the virtual machines to manage the application workloads, thereby, avoiding the security issues associated with user login to the virtual machines and decreasing application workload start times. Moreover, illustrative embodiments enable an application workload to run in a virtual machine on a remote host node within a hybrid cloud environment.

Thus, illustrative embodiments provide one or more technical solutions that overcome a technical problem with security issues corresponding to virtual machines in container orchestration architectures. As a result, these one or more technical solutions provide a technical effect and practical application in the field of container orchestration architecture virtual machines.

With reference now to FIG. 2, a diagram illustrating an example of a virtual machine management system is depicted in accordance with an illustrative embodiment. Virtual machine management system 201 may be implemented in a computing environment, such as computing environment 100 in FIG. 1. Virtual machine management system 201 is a system of hardware and software components for automatically deploying application workloads in containers of the virtual machines eliminating a need for user login to the virtual machines to manage the application workloads. As a result, virtual machine management system 201 avoids the security issues associated with a user logging into virtual machines.

In this example, virtual machine management system 201 includes control plane node 202, worker node 204, and client device 206. However, it should be noted that virtual machine management system 201 is intended as an example only and not as a limitation on illustrative embodiments. In other words, virtual machine management system 201 can include any number of control plane nodes, worker nodes, client devices, and other devices and components not shown.

Control plane node 202 may be, for example, server 104 in FIG. 1. Worker node 204 may be, for example, computer 101 in FIG. 1. Client device 206 may be, for example, EUD 103 in FIG. 1.

In this example, container orchestration architecture 208 includes control plane node 202 and worker node 204. Container orchestration architecture 208 can be implemented in, for example, a private cloud, such as private cloud 106 in FIG. 1, or any other type of cloud environment.

User 210 utilizes client device 206 to send user data 212 to control plane node 202 via a network, such as, for example, WAN 102 in FIG. 1. Control plane node 202 is a main controlling component of a cluster of worker nodes, which includes worker node 204. Control plane node 202 manages the cluster's workload and directs communication across the cluster. User data 212 corresponds to virtual machine 228 and includes a custom resource definition of virtual machine 228 and a definition of an application workload to be run on one or more containers in virtual machine 228.

Control plane node 202 includes API server 214 and virtual machine controller 216. Control plane node 202 utilizes API server 214 to receive user data 212 from client device 206. API server 214 provides internal and external interfaces for control plane node 202. API server 214 processes and validates resource availability requests, allowing users, such as user 210, to configure application workloads across worker nodes in the cluster.

Virtual machine controller 216 monitors API server 214 for receipt of new user data, such as user data 212, corresponding to a given virtual machine. In this example, in response to API server 214 receiving user data 212 with the custom resource definition of virtual machine 228 and the definition of the application workload to be run on one or more containers in virtual machine 228, virtual machine controller 216 assigns virtual machine 228, which will run the application workload, to worker node 204 based on the custom resource definition of virtual machine 228 and the application workload definition.

API server 214 sends the assignment of virtual machine 228, along with the custom resource definition of virtual machine 228 and the application workload definition, to worker node 204. Worker node 204 utilizes agent 218 to receive the assignment of virtual machine 228 from API server 214. In response to receiving the assignment of virtual machine 228, along with the custom resource definition of virtual machine 228 and the application workload definition, agent 218 invokes virtual machine handler 220 of worker node 204.

Virtual machine handler 220 then generates pod 222 in worker node 204 for virtual machine 228 based on virtual machine instance custom resource definition 224. It should be noted that virtual machine instance custom resource definition 224 is the same as the custom resource definition of virtual machine 228 included in user data 212. Afterward, virtual machine handler 220 passes virtual machine instance custom resource definition 224 to virtual machine launcher 226 of pod 222. Virtual machine launcher 226 automatically starts virtual machine 228 on worker node 204 based on virtual machine instance custom resource definition 224 (i.e., the custom resource definition of virtual machine 228). Further, in response to virtual machine launcher 226 starting virtual machine 228, workload interpreter 230 of virtual machine 228 generates set of containers 232 in virtual machine 228 based on container configuration file 234. Then, workload interpreter 230 runs the application workload on set of containers 232 in virtual machine 228 based on application workload definition 236. It should be noted that application workload definition 236 is the same as the definition for the application workload included in user data 212.

With reference now to FIG. 3, a diagram illustrating an example of an alternative virtual machine management system is depicted in accordance with an illustrative embodiment. Alternative virtual machine management system 300 may be implemented in a computing environment, such as computing environment 100 in FIG. 1. Also, it should be noted that alternative virtual machine management system 300 is similar to virtual machine management system 201 in FIG. 2. For example, alternative virtual machine management system 300 includes control plane node 302, worker node 304, and client device 306, such as control plane node 202, worker node 204, and client device 206 in FIG. 2. In addition, alternative virtual machine management system 300 includes remote host node 308. Remote host node 308 may be another server 104 in FIG. 1.

In this example, container orchestration architecture 310 includes control plane node 302, worker node 304, and remote host node 308. Container orchestration architecture 310 can be implemented in, for example, a hybrid cloud. For example, control plane node 302 and worker node 304 can be located in a private cloud, such as private cloud 106 in FIG. 1, and remote host node 308 can be located in a public cloud, such as public cloud 105 in FIG. 1.

User 312 utilizes client device 306 to send user data 314 to control plane node 302 via a network, such as, for example, WAN 102 in FIG. 1. User data 314 corresponds to virtual machine 228 and includes a custom resource definition of virtual machine 336 and a definition of an application workload to be run on one or more containers in virtual machine 336.

Control plane node 302 includes API server 316 and virtual machine controller 318. Control plane node 302 utilizes API server 316 to receive user data 314 from client device 306. In response to API server 316 receiving user data 314 with the custom resource definition of virtual machine 336 and the definition of the application workload to be run on one or more containers in virtual machine 336, virtual machine controller 318 assigns virtual machine 336 to worker node 304 based on the custom resource definition of virtual machine 336 and the application workload definition.

API server 316 sends the assignment of virtual machine 336, along with the custom resource definition of virtual machine 336 and the application workload definition, to worker node 304. Worker node 304 utilizes agent 320 to receive the assignment of virtual machine 336 from API server 316. Agent 320 then invokes virtual machine handler 322 of worker node 304.

Virtual machine handler 322 generates pod 324 in worker node 304 for virtual machine 336 based on virtual machine instance custom resource definition 326. It should be noted that virtual machine instance custom resource definition 326 is the same as the custom resource definition of virtual machine 336 included in user data 314. Afterward, virtual machine handler 322 passes virtual machine instance custom resource definition 326 to virtual machine launcher 328 of pod 324.

Virtual machine launcher 328 then sends virtual machine instance custom resource definition 326 (i.e., the custom resource definition of virtual machine 336) and application workload definition 344, which is the same as the definition of the application workload in user data 314, to IaaS broker 330. IaaS broker 330 selects IaaS service provider 332 from IaaS service providers 334 to host virtual machine 336 on remote host node 308, which corresponds to IaaS service provider 332, based on a set of criteria, such as, for example, cost, availability, resources, and the like, along with virtual machine instance custom resource definition 326 and application workload definition 344.

In response to IaaS broker 330 selecting IaaS service provider 332 to host virtual machine 336 on remote host node 308, virtual machine launcher 328 automatically starts virtual machine 336 on remote host node 308 based on virtual machine instance custom resource definition 326. Then, workload interpreter 338 of virtual machine 336 generates set of containers 340 in virtual machine 336 based on container configuration file 342. Afterward, workload interpreter 338 runs the application workload on set of containers 340 in virtual machine 336 based on application workload definition 344.

Figure 4:
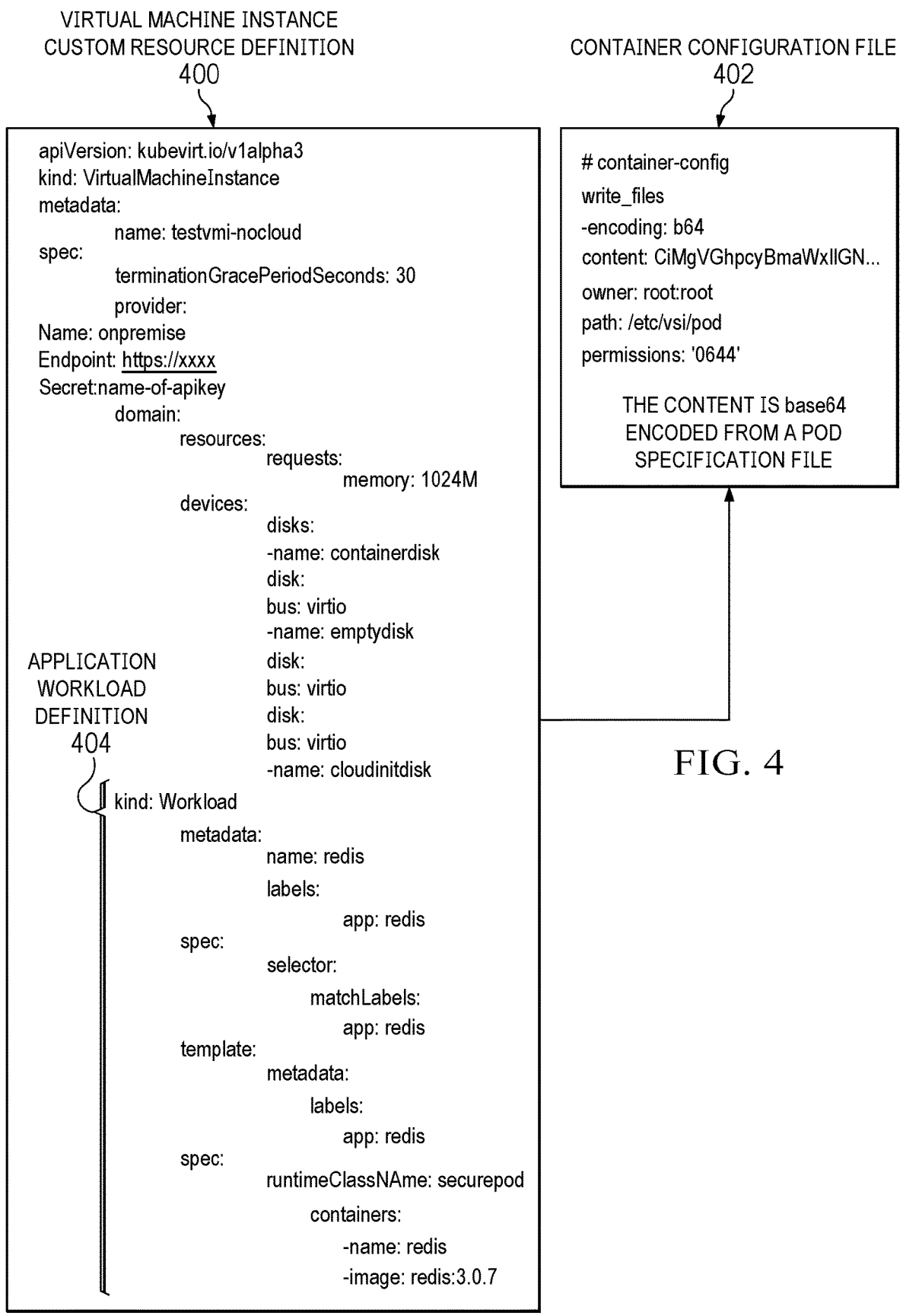
FIG. 4 is a diagram illustrating an example of a virtual machine instance custom resource definition and container configuration file in accordance with an illustrative embodiment.

With reference now to FIG. 4, an example of a virtual machine instance custom resource definition and container configuration file is depicted in accordance with an illustrative embodiment. Virtual machine instance custom resource definition 400 and container configuration file 402 may be, for example, virtual machine instance custom resource definition 326 and container configuration file 342 in FIG. 3. Virtual machine instance custom resource definition 400 includes application workload definition 404. Application workload definition 404 may be, for example, application workload definition 344 in FIG. 3. Virtual machine instance custom resource definition 400 and application workload definition 404 can be included in user data, such as, for example, user data 314 in FIG. 3, which corresponds to a particular virtual machine, such as, for example, virtual machine 336 in FIG. 3.

However, it should be noted that virtual machine instance custom resource definition 400, container configuration file 402, and application workload definition 404 are intended as examples only and not as limitations on illustrative embodiments. For example, virtual machine instance custom resource definition 400, container configuration file 402, and application workload definition 404 are specific instances of a virtual machine instance custom resource definition, container configuration file, and application workload definition. Illustrative embodiments can utilize any type of virtual machine instance custom resource definition, container configuration file, and application workload definition. Further, illustrative embodiments can include more or less information than shown in different virtual machine instance custom resource definitions, container configuration files, and application workload definitions. Furthermore, illustrative embodiments encode the content of virtual machine instance custom resource definition 400, container configuration file 402, and application workload definition 404 to increase security.

Figure 5:
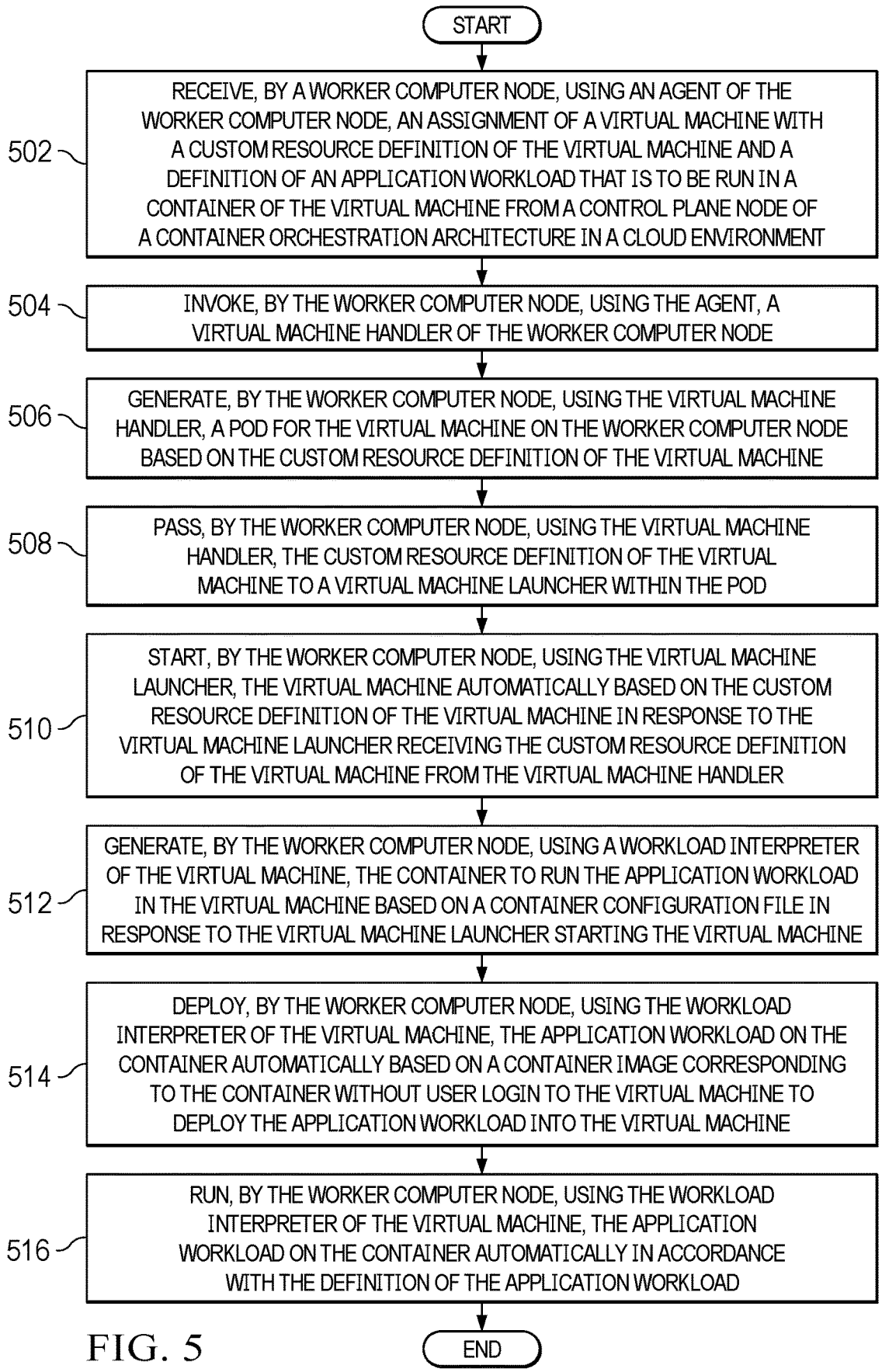
FIG. 5 is a flowchart illustrating a process for virtual machine management in accordance with an illustrative embodiment.

With reference now to FIG. 5, a flowchart illustrating a process for virtual machine management is shown in accordance with an illustrative embodiment. The process shown in FIG. 5 may be implemented in a worker computer node, such as, for example, computer 101 in FIG. 1 or worker node 204 in FIG. 2. For example, the process shown in FIG. 5 may be implemented in virtual machine management code 200 in FIG. 1.

The process begins when the worker computer node, using an agent of the worker computer node, receives an assignment of a virtual machine with a custom resource definition of the virtual machine and a definition of an application workload that is to be run in a container of the virtual machine from a control plane node of a container orchestration architecture in a cloud environment (step 502). The worker computer node, using the agent, invokes a virtual machine handler of the worker computer node in response to receiving the assignment of the virtual machine with the custom resource definition of the virtual machine and the definition of the application workload (step 504).

The worker computer node, using the virtual machine handler, generates a pod for the virtual machine on the worker computer node based on the custom resource definition of the virtual machine (step 506). In addition, the worker computer node, using the virtual machine handler, passes the custom resource definition of the virtual machine to a virtual machine launcher within the pod (step 508).

The worker computer node, using the virtual machine launcher, starts and configures the virtual machine automatically based on the custom resource definition of the virtual machine in response to the virtual machine launcher receiving the custom resource definition of the virtual machine from the virtual machine handler (step 510). Further, the worker computer node, using a workload interpreter of the virtual machine, generates the container to run the application workload in the virtual machine based on a container configuration file in response to the virtual machine launcher starting the virtual machine (step 512). Furthermore, the worker computer node, using the workload interpreter of the virtual machine, automatically deploys the application workload on the container based on a container image corresponding to the container without user login to the virtual machine to deploy the application workload into the virtual machine avoiding security issues associated with the user login to the virtual machine and decreasing application workload start time (step 514). Moreover, the worker computer node, using the workload interpreter of the virtual machine, automatically runs the application workload on the container in accordance with the definition of the application workload (step 516). Thereafter, the process terminates.

Figure 6:
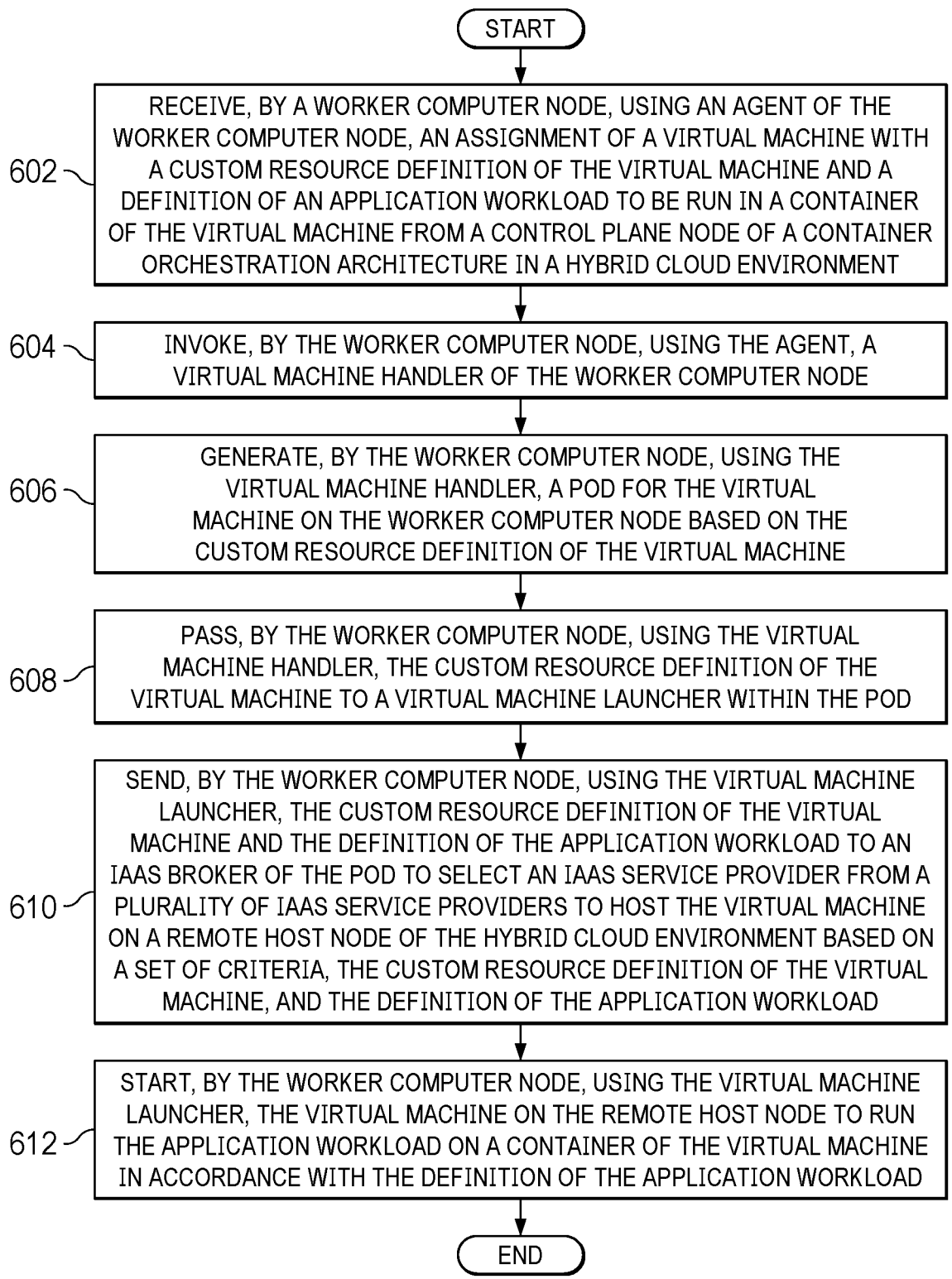
FIG. 6 is a flowchart illustrating an alternative process for virtual machine management in accordance with an illustrative embodiment.

With reference now to FIG. 6, a flowchart illustrating an alternative process for virtual machine management is shown in accordance with an illustrative embodiment. The alternative process shown in FIG. 6 may be implemented in a worker computer node, such as, for example, computer 101 in FIG. 1 or worker node 304 in FIG. 3. For example, the process shown in FIG. 6 may be implemented in virtual machine management code 200 in FIG. 1.

The process begins when the worker computer node, using an agent of the worker computer node, receives an assignment of a virtual machine with a custom resource definition of the virtual machine and a definition of an application workload to be run in a container of the virtual machine from a control plane node of a container orchestration architecture in a hybrid cloud environment (step 602). The worker computer node, using the agent, invokes a virtual machine handler of the worker computer node in response to receiving the assignment of the virtual machine with the custom resource definition of the virtual machine and the definition of the application workload (step 604).

The worker computer node, using the virtual machine handler, generates a pod for the virtual machine on the worker computer node based on the custom resource definition of the virtual machine (step 606). The worker computer node, using the virtual machine handler, passes the custom resource definition of the virtual machine and the definition of the application workload to a virtual machine launcher within the pod (step 608). The worker computer node, using the virtual machine launcher, sends the custom resource definition of the virtual machine and the definition of the application workload to an IaaS broker of the pod to select an IaaS service provider from a plurality of IaaS service providers to host the virtual machine on a remote host node of the hybrid cloud environment based on a set of criteria, the custom resource definition of the virtual machine, and the definition of the application workload (step 610). The worker computer node, using the virtual machine launcher, starts the virtual machine on the remote host node to run the application workload on a container of the virtual machine in accordance with the definition of the application workload (step 612). Thereafter, the process terminates.

Thus, illustrative embodiments of the present invention provide a computer-implemented method, computer system, and computer program product for automatically running application workloads in containers within virtual machines of a container orchestration architecture in a secure manner. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for virtual machine management, the computer-implemented method comprising:
   sending, by a computer, using a virtual machine launcher of the computer, a custom resource definition of a virtual machine and a definition of an application workload to an Infrastructure-as-a-Service (IaaS) broker included in a pod with the virtual machine launcher of the computer to select an IaaS service provider from a plurality of IaaS service providers to host the virtual machine on a remote host node of the IaaS service provider based on a set of criteria, the custom resource definition of the virtual machine, and the definition of the application workload; and
   starting, by the computer, using the virtual machine launcher of the computer, the virtual machine automatically on the remote host node of the IaaS service provider to run the application workload in a container of the virtual machine on the remote host node in accordance with the definition of the application workload.

2. The computer-implemented method of claim 1 further comprising:
receiving, by the computer, using an agent of the computer, an assignment of the virtual machine along with the custom resource definition of the virtual machine and the definition of the application workload that is to be run in the container of the virtual machine on the remote host node from a control plane node; and
invoking, by the computer, using the agent, a virtual machine handler of the computer in response to receiving the assignment of the virtual machine on the remote host node along with the custom resource definition of the virtual machine and the definition of the application workload.

3. The computer-implemented method of claim 2, wherein the control plane node is part of a container orchestration architecture.

4. The computer-implemented method of claim 1 further comprising:
generating, by the computer, using a virtual machine handler of the computer, the pod for the virtual machine launcher and the IaaS broker on the computer; and
passing, by the computer, using the virtual machine handler of the computer, the custom resource definition of the virtual machine to the virtual machine launcher within the pod that includes the IaaS broker on the computer.

5. The computer-implemented method of claim 1, wherein the remote host node running the application workload in the container of the virtual machine on the remote host node is located in a public cloud of a hybrid cloud environment and the computer containing the virtual machine launcher and the IaaS broker is located in a private cloud of the hybrid cloud environment.

6. The computer-implemented method of claim 1, wherein the computer, using a workload interpreter of the virtual machine on the remote host node, automatically deploys the application workload on the container of the virtual machine on the remote host node based on a container image corresponding to the container without user login to the virtual machine to deploy the application workload into the virtual machine avoiding security issues associated with the user login to the virtual machine and decreasing application workload start time.

7. The computer-implemented method of claim 1, wherein the computer is a worker node in a container orchestration architecture of a hybrid cloud environment that includes the remote host node and a control plane node.

8. The computer-implemented method of claim 1, wherein the set of criteria includes service level agreement, user need, IaaS service provider availability, IaaS service provider pricing, and IaaS service provider resources.

9. A computer system for virtual machine management, the computer system comprising:
a communication fabric;
a storage device connected to the communication fabric, wherein the storage device stores program instructions; and
a processor connected to the communication fabric, wherein the processor executes the program instructions to:
send, using a virtual machine launcher of the computer system, a custom resource definition of a virtual machine and a definition of an application workload to an Infrastructure-as-a-Service (IaaS) broker included in a pod with the virtual machine launcher of the computer system to select an IaaS service provider from a plurality of IaaS service providers to host the virtual machine on a remote host node of the IaaS service provider based on a set of criteria, the custom resource definition of the virtual machine, and the definition of the application workload; and
start, using the virtual machine launcher of the computer system, the virtual machine automatically on the remote host node of the IaaS service provider to run the application workload in a container of the virtual machine on the remote host node in accordance with the definition of the application workload.

10. The computer system of claim 9, wherein the processor further executes the program instructions to:
receive, using an agent of the computer system, an assignment of the virtual machine along with the custom resource definition of the virtual machine and the definition of the application workload that is to be run in the container of the virtual machine on the remote host node from a control plane node; and
invoke, using the agent, a virtual machine handler of the computer system in response to receiving the assignment of the virtual machine on the remote host node along with the custom resource definition of the virtual machine and the definition of the application workload.

11. The computer system of claim 10, wherein the control plane node is part of a container orchestration architecture.

12. The computer system of claim 9, wherein the processor further executes the program instructions to:
generate, using a virtual machine handler of the computer system, the pod for the virtual machine launcher and the IaaS broker on the computer system; and
pass, using the virtual machine handler of the computer system, the custom resource definition of the virtual machine to the virtual machine launcher within the pod that includes the IaaS broker on the computer system.

13. The computer system claim 9, wherein the set of criteria includes service level agreement, user need, IaaS service provider availability, IaaS service provider pricing, and IaaS service provider resources.

14. A computer program product for virtual machine management, the computer program product comprising a computer-readable storage medium having program instructions embodied therewith, the program instructions executable by a computer to cause the computer to perform a method of:
sending, by the computer, using a virtual machine launcher of the computer, a custom resource definition of a virtual machine and a definition of an application workload to an Infrastructure-as-a-Service (IaaS) broker included in a pod with the virtual machine launcher of the computer to select an IaaS service provider from a plurality of IaaS service providers to host the virtual machine on a remote host node of the IaaS service provider based on a set of criteria, the custom resource definition of the virtual machine, and the definition of the application workload; and
starting, by the computer, using the virtual machine launcher of the computer, the virtual machine automatically on the remote host node of the IaaS service provider to run the application workload in a container of the virtual machine on the remote host node in accordance with the definition of the application workload.

15. The computer program product of claim 14 further comprising:
receiving, by the computer, using an agent of the computer, an assignment of the virtual machine along with the custom resource definition of the virtual machine and the definition of the application workload that is to be run in the container of the virtual machine on the remote host node from a control plane node; and
invoking, by the computer, using the agent, a virtual machine handler of the computer in response to receiving the assignment of the virtual machine on the remote host node along with the custom resource definition of the virtual machine and the definition of the application workload.

16. The computer program product of claim 15, wherein the control plane node is part of a container orchestration architecture.

17. The computer program product of claim 14 further comprising:
generating, by the computer, using a virtual machine handler of the computer, the pod for the virtual machine launcher and the IaaS broker on the computer; and
passing, by the computer, using the virtual machine handler of the computer, the custom resource definition of the virtual machine to the virtual machine launcher within the pod that includes the IaaS broker on the computer.

18. The computer program product of claim 14, wherein the remote host node running the application workload in the container of the virtual machine on the remote host node is located in a public cloud of a hybrid cloud environment and the computer containing the virtual machine launcher and the IaaS broker is located in a private cloud of the hybrid cloud environment.

19. The computer program product of claim 14, wherein the computer, using a workload interpreter of the virtual machine on the remote host node, automatically deploys the application workload on the container of the virtual machine on the remote host node based on a container image corresponding to the container without user login to the virtual machine to deploy the application workload into the virtual machine avoiding security issues associated with the user login to the virtual machine and decreasing application workload start time.

20. The computer program product of claim 14, wherein the set of criteria includes service level agreement, user need, IaaS service provider availability, IaaS service provider pricing, and IaaS service provider resources.

* * * * *